(12) United States Patent
Zhou et al.

(10) Patent No.: US 12,533,720 B2
(45) Date of Patent: Jan. 27, 2026

(54) GROUNDWATER CIRCULATION WELL GROUP AND CIRCULATING MODE CONTROL METHOD THEREFOR

(71) Applicant: Jilin University, Changchun (CN)

(72) Inventors: Rui Zhou, Changchun (CN); Shujun Dong, Changchun (CN); Zhang Fang, Changchun (CN); Hejun Ren, Changchun (CN)

(73) Assignee: JILIN UNIVERSITY, Changchun (CN)

( * ) Notice: Subject to any disclaimer, the term of this patent is extended or adjusted under 35 U.S.C. 154(b) by 389 days.

(21) Appl. No.: 18/233,016

(22) Filed: Aug. 11, 2023

(65) Prior Publication Data

US 2024/0216966 A1 Jul. 4, 2024

(30) Foreign Application Priority Data

Dec. 30, 2022 (CN) .......................... 202211741501.6

(51) Int. Cl.
*B09C 1/00* (2006.01)
*C02F 1/00* (2023.01)
*C02F 103/06* (2006.01)

(52) U.S. Cl.
CPC .............. *B09C 1/002* (2013.01); *C02F 1/001* (2013.01); *C02F 1/008* (2013.01); *B09C 2101/00* (2013.01); *C02F 2103/06* (2013.01); *C02F 2209/03* (2013.01); *C02F 2209/40* (2013.01); *C02F 2301/046* (2013.01)

(58) Field of Classification Search
CPC ..... B09C 1/002; B09C 2101/00; C02F 1/001; C02F 1/008; C02F 2103/06; C02F 2209/03; C02F 2209/40; C02F 2301/046
USPC .......................................................... 210/739
See application file for complete search history.

(56) References Cited

FOREIGN PATENT DOCUMENTS

| CN | 212387755 U | * | 1/2021 |
| CN | 217350884 U | * | 9/2022 |

OTHER PUBLICATIONS

Translation of Peng (CN 212387755 U) (Year: 2021).*
Translation of Qu (CN 217350884 U) (Year: 2022).*

* cited by examiner

*Primary Examiner* — Ekandra S. Miller-Cruz

(57) ABSTRACT

The present disclosure relates to a groundwater circulation well group and a circulation mode control method therefor. The groundwater circulation well group includes at least two multi-filter-layer groundwater circulation wells, multiple pumping/injection assemblies, and a control module. The at least two multi-filter-layer groundwater circulation wells are arranged in order along a groundwater flow direction. A wellbore of each multi-filter-layer groundwater circulation well is separated by at least two first packers to form three pumping/injection sections, and each pumping/injection section is internally provided with at least one pumping/injection assembly for water pumping/injection. The water pumping and/or water injection of the pumping/injection assembly is controlled by the control module. A pipe wall of each pumping/injection section is provided with a perforated water pumping/injection screen section.

18 Claims, 3 Drawing Sheets

GROUNDWATER CIRCULATION WELL GROUP AND CIRCULATING MODE CONTROL METHOD THEREFOR

CROSS-REFERENCE TO RELATED APPLICATION

This patent application claims the benefit and priority of Chinese Patent Application No. 202211741501.6, filed with the China National Intellectual Property Administration on Dec. 30, 2022, the disclosure of which is incorporated by reference herein in its entirety as part of the present application.

TECHNICAL FIELD

The present disclosure relates to the technical field of in-situ remediation of groundwater pollution, and in particular to a groundwater circulation well group and a circulation mode control method therefor.

BACKGROUND

Groundwater circulation well (GCW) technology is an in-situ groundwater remediation technology, which has significant advantages such as small floor space, wide application, high efficiency and low cost, can be used in combination with chemical oxidation, biodegradation, in-situ heating and other remediation technologies, can achieve the remediation of groundwater by comprehensively using physical, chemical and biological processes and solve the problem of simultaneous remediation of multi-component and refractory organic pollution in groundwater, and thus has great development potential and broad application prospects. GCW has been widely used in the United States and Germany and other countries, and has a number of successful engineering remediation cases. This technology has always been monopolized by patents in the United States and Germany, and is started late in China. At present, it is still in the research stage in China, and the complete set of equipment is in blank, and cases of site engineering remediation of groundwater circulation well technology have not been formed.

As an advanced in-situ remediation technology, the main factors that restrict the large-scale application of GCW in China are as follows: (1) Underground aquifers mainly consist of multi-layer heterogeneous media with different properties, with diverse structures and distributions, and most of heterogeneous aquifers are distributed in layers, while the traditional double-screen groundwater circulation wells have high requirements on hydrogeological conditions of the site, the aquifers with strong anisotropy have poor remediation effect, and the large permeability difference affects the remediation efficiency and may even lead to the failure of the groundwater circulation wells. (2) The hydrogeological characteristics and pollution characteristics of the polluted site are not fully considered when the traditional two-section groundwater circulation well is used for groundwater pollution remediation, and remediation method is not timely adjusted according to the remediation degree and conditions during remediation, which may easily lead to low remediation efficiency, poor remediation effect and other consequences. (3) There is a lack of design of groundwater circulation well group according to the characteristics of the polluted site, as well as the regulation of circulation modes, and control methods for the coupling and interaction among multiple wells are still unclear.

Existing groundwater circulation wells for in-situ remediation of groundwater are generally two-section groundwater circulation wells, and only two circulation modes are formed for water circulation, i.e., pumping at the upper section and injecting at the lower section, and injecting at the upper section and pumping at the lower section. The circulation contours of these two circulation modes are similar, so even by adjusting the flow rate, the remediation ranges and similar circulation contours are formed. For aquifers with different pollution degrees, it is impossible to conduct short-term remediation on seriously polluted aquifers, only the current water circulation mode can be relied upon for long-term remediation until the groundwater remediation standard is achieved. When multiple two-section groundwater circulation wells are arranged in a water flow direction, the water circulation modes of two two-section groundwater circulation wells are similar, pollutants in the water flow capture range of the groundwater circulation wells are synchronously remediated and removed. As a result, highly contaminated areas take a long time to remediate with groundwater circulation wells, while lightly contaminated areas have already been remediated, resulting in wasted energy. When the groundwater circulation wells are not operated for an enough time, the remediation of highly contaminated areas cannot be achieved.

For example, a multi-effect reactive groundwater circulation well group and remediation method are disclosed in the Chinese Patent with publication number of CN113184930. The groundwater circulation well group includes a remediation wells group and an observation wells group. The remediation wells group includes multiple remediation wells uniformly arranged on a remediation center line. The observation wells group includes multiple observation wells arranged around the remediation wells farthest from a pollution source. According to the multi-effect reactive groundwater circulation well group, through the arrangement of the remediation wells and the observation wells, in the continuous detection process, polluted water is chemically treated by using a chemical agent box, the polluted water is continuously pumped to the chemical agent box by using a circulating pump, and the groundwater with low pollution degree after reaction is discharged into the groundwater aquifer through patterned holes on an upper well pipe. By adopting the two-section groundwater circulation well, the formed water circulation mode is limited. No matter how to change the pumping/injecting modes of two adjacent groundwater circulation wells, it is impossible to conduct targeted enhancement remediation for highly contaminated areas.

During the investigation of polluted sites, it was found that even in the pollution plume of the same polluted site, the pollutant distributions in different regions were different. Take the example of a site contaminated by DNAPL, in case 1, in the vicinity of a pollution source, the pollution range is wide and the concentration is high, the pollutants are mainly distributed in the upper aquifer with a high hydraulic conductivity, and such a condition is of little significance to the remediation of the second aquifer. In case 2, at the edge of the pollution plume downstream of the pollution source, the pollution range is narrow and the concentration is low, the pollutants are mainly distributed in a lower aquifer with a low hydraulic conductivity. The above two conditions have little significance for the remediation of the first aquifer, and the circulation of the two-section groundwater circulation well makes the pollutants in the upper or lower layer enter the unpolluted aquifer instead. In case 3, the pollutants are uniformly distributed in the first aquifer and the second aquifer. In case 4, a vertical distribution of the pollution plume between two groundwater circulation wells is wide, and the edge position of the pollution plume is basically flush with a screen section. In case 5, a vertical distribution of the pollution plume between two groundwater circulation wells is narrow, and pollutants are mainly concentrated between upper and lower screen sections. In the cases 3 to 5, the two-section groundwater circulation wells cannot effectively remediate the pollutants in the vicinity of the edge of the pollution plume between the groundwater circulation wells, leading to the formation of a remediation blind zone. Therefore, the current two-section groundwater circulation well is limited in the circulation mode, which cannot be fully applied to complicated groundwater pollution conditions.

Based on the defects of the two-section groundwater circulation well in the prior art, a three-section multi-filter-layer groundwater circulation well is provided, and multiple control modes for the complicated groundwater pollution conditions are provided, and even the polluted groundwater can be remediated in a targeted way by isolating the polluted groundwater.

Further, on the one hand, there is certainly discrepancy between the prior art comprehended by those skilled in the art. On the other hand, the applicant has studied a large number of literatures and patent documents during the creation of the present disclosure, but not all the details and disclosures are listed in detail due to the limitation of space, however, this does not mean that the present disclosure does not have these features of the prior art, rather the present disclosure already has all the features of the prior art, and the applicant reserves the right to add relevant prior art to the background art.

SUMMARY

A two-section groundwater circulation well in the prior art at least includes the following defects: there are few circulation modes and few interaction modes between adjacent groundwater circulation wells, a first aquifer and a second aquifer can only be simultaneously subjected to major circulation remediation, the water flow circulation cannot be enhanced for a certain severely polluted aquifer, so the remediation time is long, resulting in low remediation efficiency.

For the shortcomings in the prior art, a groundwater circulation well group is provided. The groundwater circulation well group includes at least two multi-filter-layer groundwater circulation wells, multiple pumping/injection assemblies, and a control module. The at least two multi-filter-layer groundwater circulation wells are arranged in order along a groundwater flow direction. A wellbore of each multi-filter-layer groundwater circulation well is separated by at least two first packers to form three pumping/injection sections. Each pumping/injection section is internally provided with at least one pumping/injection assembly for water pumping/injection, and the water pumping and/or water injection of the pumping/injection assembly is controlled by the control module. A pipe wall of each pumping/injection section is provided with a perforated water pumping/injection screen section. In response to a control instruction of the control module, the pumping/injection states, flow rates and pressures of three pumping/injection sections of each multi-filter-layer groundwater circulation well are changed by the pumping/injection assembly to form different water circulation modes or water circulation combination modes.

Compared with the two-section groundwater circulation well, a three-section groundwater circulation well is creatively designed in accordance with the present disclosure. In addition to the tradition major circulation remediation mode, the multi-filter-layer groundwater circulation well can increase the remediation circulation frequency of groundwater by implementing the minor circulation for a first aquifer or a second aquifer while conducting major circulation remediation. Due to the increase of the circulation mode of a single multi-filter-layer groundwater circulation well, the circulation combination mode formed by the combination of adjacent groundwater circulation wells increases correspondingly, and then the remediation efficiency of the whole groundwater circulation well group is increased and improved, thereby achieving a circulation combination mode and remediation effect that cannot be achieved by the two-section groundwater circulation well group.

Preferably, the wellbore is separated by the two first packers to form a first pumping/injection section, a second pumping/injection section and a third pumping/injection section, horizontal heights of the first pumping/injection section, the second pumping/injection section and the third pumping/injection section decrease in order, and the horizontal height of the second pumping/injection section is close to or equal to a horizontal height of a medium stratification interface. The water circulation modes formed by the control module based on changing the pumping/injection state of each pumping/injection section at least include: a first minor circulation formed by the combination of the first pumping/injection section and the second pumping/injection section and located in a first aquifer, in which water flows out from the first pumping/injection section and then flows into the second pumping/injection section after passing through the first aquifer, or water flows out from the second pumping/injection section and then flows into the first pumping/injection section after passing through the first aquifer; a second minor circulation formed by the combination of the second pumping/injection section and the third pumping/injection section and located in a second aquifer, in which water flows out from the second pumping/injection section and then flows into the third pumping/injection section after passing through the second aquifer, or water flows out from the third pumping/injection section and then flows into the second pumping/injection section after passing through the second aquifer; a dual circulation commonly formed by the first pumping/injection section, the second pumping/injection section and the third pumping/injection section, in which water flows out from the first pumping/injection section and the third pumping/injection section and then flows into the second pumping/injection section after respectively passing through the first aquifer and the second aquifer, or water flows out from the second pumping/injection section and then respectively flows into the first pumping/injection section and the third pumping/injection section after respectively passing through the first aquifer and the second aquifer; and a major circulation formed by the combination of the first pumping/injection section and the third pumping/injection section, in which water flows out from the first pumping/injection section and then flows into the third pumping/injection section after passing through the first aquifer and the second aquifer successively, or water flows out from the third pumping/injection section and then flows into the first pumping/injection section after passing through the second aquifer and the first aquifer successively. In a case that the pumping/injection state, the flow rate, the pressure and a circulation direction are regulated by the control module, the first minor circulation, the second minor circulation, the dual circulation and the major circulation can be combined under the control of the control module to form at least one water circulation combination mode.

Apparently, the multi-filter-layer groundwater circulation well of the present disclosure has as many as four water circulation modes, the water circulation modes can be circulated simultaneously to form a combination for use, and adjacent groundwater circulation wells can also be used to achieve multi-frequency groundwater remediation by forming more water circulation combination modes through the cooperation of pumping/injection directions, or even a formed hydraulic barrier can prevent a pollution plume from spreading downstream.

Preferably, an adaptive water circulation mode or a water circulation combination mode is selected by the control module based on distribution characteristics of pollutants in the aquifer.

Due to multiple water circulation modes in the present disclosure, the first aquifer, the second aquifer and the central region can be specially remediated within the groundwater circulation well remediation range and between the groundwater circulation wells, so there is no blind zone in the remediation of the groundwater circulation well group, and the remediation effect is better.

Preferably, the multi-filter-layer groundwater circulation well further includes multiple auxiliary wells. The auxiliary wells are arranged with the multi-filter-layer groundwater circulation well as the center. A wellbore of each auxiliary well is separated by a second packer into two space portions. At least one space portion of the auxiliary well is provided with at least one injection pump connected by an injection pipe. A horizontal height of the second packer is close to or equal to the horizontal height of the medium stratification interface.

Through the arrangement of the auxiliary wells, the groundwater remediation condition can be observed, and chemical agents can be injected into different aquifers respectively to enhance the groundwater remediation effect. The water circulation combination mode may also be changed according to the groundwater remediation condition, thus reducing the meaningless remediation of pollution-free areas and reducing the energy consumption.

Preferably, based on the change of groundwater remediation degree, the water circulation combination mode is changed by the control module in a manner of closing at least one of the multi-filter-layer groundwater circulation well in order.

In an operation mode of the traditional groundwater circulation well group, various groundwater circulation wells are all started for remediation. With the progress of groundwater remediation, there are fewer and fewer pollutants downstream, but the water circulation mode of each groundwater circulation well has not changed, which leads to the fact that some pollution-free aquifers are still remediated by using the groundwater circulation wells, resulting in waste of materials and energy, and increasing the risk of secondary environmental pollution. Based on this, according to the change of groundwater remediation condition, the groundwater circulation wells without remediation significance are closed in order, the operation of the groundwater circulation well is reduced without affecting the groundwater remediation efficiency, and the energy consumption is reduced.

Preferably, based on the groundwater pollution condition, a water circulation mode, a flow rate and/or a pressure of each multi-filter-layer groundwater circulation well is regulated by the control module in a manner of enabling polluted groundwater to circulate in the groundwater circulation well group, thereby forming a truncation effect on the polluted groundwater In the traditional groundwater circulation well group, due to the simple water circulation mode, the polluted groundwater is impossible to form a complete circulation in a groundwater polluted area in a manner of pumping/injection, and pressure combination, and it is also impossible to prevented the polluted groundwater from continuing to flow downstream. In the present disclosure, due to the existence of multiple water circulation modes, the polluted groundwater is enabled to circuit in the groundwater circulation well group through the pressure difference, the fact that the polluted groundwater is truncated is achieved, and the remediated groundwater can be discharged downstream, and thus the groundwater remediation effect is better.

Preferably, in a case that pollutants are mainly distributed in the first aquifer or the second aquifer, the control module is used to conduct groundwater remediation based on a water circulation combination mode formed by the combination of the first minor circulation or the second minor circulation and the major circulation. In a case that the pollutants are relatively uniformly distributed in the first aquifer and the second aquifer, the control module is used to conduct groundwater remediation based on the dual circulation mode. In a case that the vertical distribution of a pollution plume between the multi-filter-layer groundwater circulation wells is wide, and an edge position of the pollution plume is basically flush with the screen section, the control module is used to conduct a water circulation combination mode in a manner of enabling adjacent multi-filter-layer groundwater circulation wells to conduct water circulation according to a dual circulation mode with opposite circulation directions. In a case that a vertical distribution of a pollution plume between the multi-filter-layer groundwater circulation wells is narrow, and pollutants are mainly concentrated between upper and lower screen sections, the control module is used to conduct a water circulation combination mode in a manner of enabling adjacent multi-filter-layer groundwater circulation wells to conduct water circulation according to a dual circulation mode with the same circulation direction. Apparently, the multi-filter-layer groundwater circulation well group can achieve targeted water circulation combination mode for different groundwater pollution characteristics and improve the groundwater remediation efficiency.

It is also provided a circulation mode control method for a groundwater circulation well group according to the present disclosure. The control method at least includes: regulating pumping states, flow rates and pressures of three pumping/injection sections of each multi-filter-layer groundwater circulation well to form different water circulation modes or water circulation combination modes. A wellbore of each multi-filter-layer groundwater circulation well is separated by at least two first packers to form three pumping/injection sections, each pumping/injection section is internally provided with at least one pumping/injection assembly for water pumping/injection, the water pumping and/or water injection of the pumping/injection assembly is controlled by a control module, and a pipe wall of each pumping/injection section is provided with a perforated water pumping/injection screen section.

Preferably, the method further includes: forming at least one water circulation mode based on changing the pumping/injection state of each pumping/injection section. The water circulation mode at least includes: a first minor circulation formed by the combination of the first pumping/injection section and the second pumping/injection section and located in a first aquifer, in which water flows out from the first pumping/injection section and then flows into the second pumping/injection section after passing through the first aquifer, or water flows out from the second pumping/injection section and then flows into the first pumping/injection section after passing through the first aquifer; a second minor circulation formed by the combination of the second pumping/injection section and the third pumping/injection section and located in a second aquifer, in which water flows out from the second pumping/injection section and then flows into the third pumping/injection section after passing through the second aquifer, or water flows out from the third pumping/injection section and then flows into the second pumping/injection section after passing through the second aquifer; a dual circulation commonly formed by the first pumping/injection section, the second pumping/injection section and the third pumping/injection section, in which water flows out from the first pumping/injection section and the third pumping/injection section and then flows into the second pumping/injection section after respectively passing through the first aquifer and the second aquifer, or water flows out from the second pumping/injection section and then respectively flows into the first pumping/injection section and the third pumping/injection section after respectively passing through the first aquifer and the second aquifer; and a major circulation formed by the combination of the first pumping/injection section and the third pumping/injection section, in which water flows out from the first pumping/injection section and then flows into the third pumping/injection section after passing through the first aquifer and the second aquifer successively, or water flows out from the third pumping/injection section and then flows into the first pumping/injection section after passing through the second aquifer and the first aquifer successively. In a case that the pumping/injection state, the flow rate, the pressure and a circulation direction are regulated by the control module, the first minor circulation, the second minor circulation, the dual circulation and the major circulation can be combined under the control of the control module to form at least one water circulation combination mode.

Preferably, the method further includes: selecting an adaptive water circulation mode or a water circulation combination mode based on distribution characteristics of pollutants in the aquifer; or changing the water circulation combination mode in a manner of closing at least one of the multi-filter-layer groundwater circulation wells in order based on the change of groundwater remediation degree; or regulating a water circulation mode, a flow rate and/or pressure of each multi-filter-layer groundwater circulation well in a manner of enabling the polluted groundwater to circulate in the groundwater circulation well group, thereby forming a truncation effect on the polluted groundwater.

As above, the control method for the groundwater circulation well group of the present disclosure can implement the water circulation combination mode pertinently for the complicated groundwater pollution conditions and eliminate the existing groundwater remediation blind zones. According to the present disclosure, more water circulation combination modes can be achieved through the water circulation mode of the three-section groundwater circulation well, and meanwhile, the water circulation combination mode can be changed according to groundwater remediation change conditions, and higher groundwater remediation efficiency is achieved.

1—main pipeline; 2—water pump/injection pump; 3—valve; 4—water pumping/injection pipe; 5—dosing device; 6—injection pipe; 7—multi-filter-layer groundwater circulation well; 8—auxiliary well; 9—water pumping/injection screen section; 10—first packer; 11—pump head; 12—bottom plug; 13—injection pump; 14—medium stratification interface; 15—vadose zone; 16—first aquifer; 17—second aquifer; 18—pollution source; 19—pollution plume; 20—wellbore; 21—filter material layer; 22—second packer.

DETAILED DESCRIPTION OF THE EMBODIMENTS

The present disclosure is described in detail below with reference to accompanying drawings.

Figure 1:
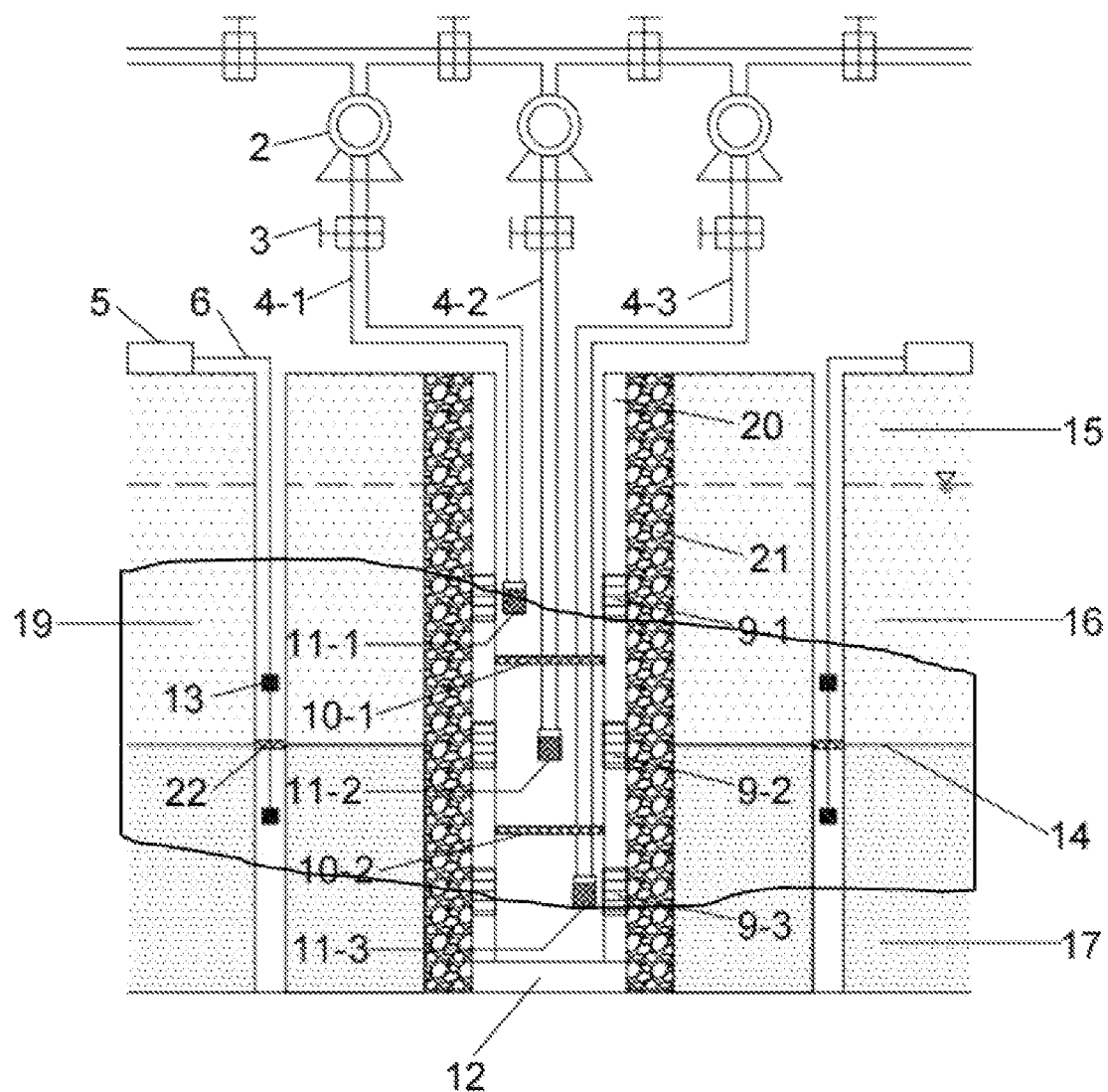
FIG. 1 is a schematic diagram of a simplified structure of a multi-filter-layer groundwater circulation well in accordance with a preferred embodiment of the present disclosure.
Figure 3:
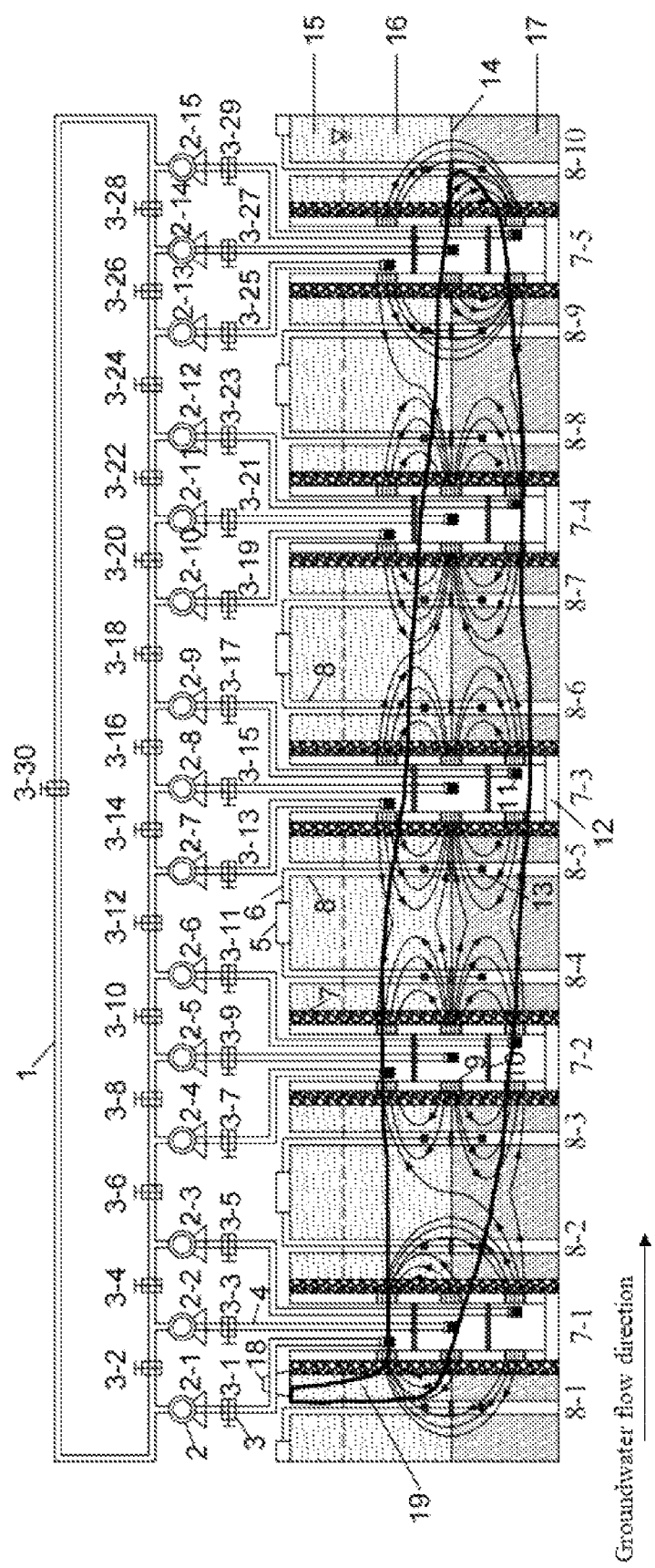
FIG. 3 is a structural schematic diagram of a multi-filter-layer groundwater circulation well group in accordance with a preferred embodiment of the present disclosure.

As shown in FIG. 1 and FIG. 3, the site in the figures is a layered heterogeneous aquifer. A first aquifer medium 16 is coarse sand and a second aquifer medium 17 is fine sand. Due to the leakage of a pollution source 18 on earth surface, some areas in a vadose zone 15 are polluted, and pollutants migrate downwards to the groundwater under the action of gravity. A pollution range of a pollution plume 19 of groundwater gradually decreases from upstream to downstream, and the pollutant concentration gradually decreases. In a distribution area of the pollution plume 19, five sets of multi-filter-layer groundwater circulation wells 7 are illustratively arranged at equal intervals in a groundwater flow direction. The drilling depth should pass through a lower edge of the pollution plume 19.

Preferably, the multi-filter layer groundwater circulation well group in the present disclosure includes at least two multi-filter-layer groundwater circulation wells, and is not limited to the five multi-filter-layer groundwater circulation wells indicated in the figure. The illustration of five multi-filter-layer groundwater circulation wells is to fully demonstrate various water circulation modes of the multi-filter-layer groundwater circulation wells.

As shown in FIG. 1, the multi-filter-layer groundwater circulation well in the present disclosure is a three-section groundwater circulation well. Preferably, the multi-filter-layer groundwater circulation well is not limited to the three-section groundwater circulation well, may also be a four-section groundwater circulation well, a five-section groundwater circulation well, etc., which also can achieve the water circulation modes of the present disclosure. In the present disclosure, the three-section groundwater circulation well is one of the most preferred embodiments, but not the only one.

The three-section groundwater circulation well is taken as an example for illustrating the water circulation mode.

As shown in FIG. 1, the multi-filter-layer groundwater circulation well 7 is of a multi-layer structure, including a wellbore 20, a filter material layer 21, a water pumping/injection screen section 9, packers 10, and a bottom plug 12. The wellbore 20 of the multi-filter-layer groundwater circulation well 7 is separated by at least two first packers 10 to form three pumping/injection sections. Preferably, the wellbore 20 is separated by the two first packers to form a first pumping/injection section, a second pumping/injection section and a third pumping/injection section, and horizontal heights of the first pumping/injection section, the second pumping/injection section and the third pumping/injection section decrease in order. The horizontal height of the second pumping/injection section is close to or equal to a horizontal height of a medium stratification interface 14, such that the first pumping/injection section is located in a first aquifer 16, and the third pumping/injection section is located in a second aquifer 17. The bottom plug 12 is located at the lowest bottom of the groundwater circulation well, and has an inner diameter in fit with an inner diameter of the groundwater circulation well, thus preventing groundwater from entering from the bottom of the groundwater circulation well.

Preferably, a pipe wall of each pumping/injection section is provided with a perforated water pumping/injection screen section 9. The water pumping/injection screen section is preferably a perforated floral pipe, that is, a pipe body provided with several holes for the circulation of groundwater.

Each pumping/injection section is internally provided with at least one pumping/injection assembly for the water pumping/injection. The water pumping and/or water injection of the pumping/injection assembly is controlled by a control module. Specifically, as shown in FIG. 1, the pumping/injection assembly includes a water pump/injection pump 2, a water pumping/injection pipe 3, and a pump head 11. A tail end of the water pumping/injection pipe 4 is connected to the pump head 11. The water pumping/injection pipe 4 is provided with at least one valve 3 for controlling on/off the water pumping/injection pipe. The valve 3 is connected to the control module in a wired or wireless manner, thus facilitating to receive a control instruction of the control module to control automatic on/off. Preferably, the valve 3 may also be arranged on the earth surface through the water pumping/injection pipe 4 and can be manually opened or closed, so as to achieve the on-off control of the water pumping/injection pipe 4.

As shown in FIG. 1, in the first pumping/injection section, a first pump head 11-1 is connected to a first water pumping/injection pipe 4-1, and the first water pumping/injection pipe 4-1 is provided with a first valve 3-1. In the second pumping/injection section, a second pump head 11-2 is connected to a second water pumping/injection pipe 4-2, and the second water pumping/injection pipe 4-2 is provided with a third valve 3-3. At the moment, the second water pumping/injection pipe 4-2 penetrates through a first sub-packer 10-1. In the third pumping/injection section, a third pump head 11-3 is connected to a third water pumping/injection pipe 4-3, and the third water pumping/injection pipe 4-3 is provided with a fifth valve 3-5. At the moment, the third water pumping/injection pipe 4-3 penetrates through the first sub-packer 10-1 and a second sub-packer 10-2.

As shown in FIG. 3, in the multi-filter-layer groundwater circulation well, the pumping/injection of each pumping/injection section can be independently controlled, thus forming multiple water circulation modes.

The water circulation modes of the multi-filter-layer groundwater circulation well at least include: a first minor circulation formed by the combination of the first pumping/injection section and the second pumping/injection section and located in the first aquifer. Specifically, as shown in FIG. 3, the first pumping/injection section is used for water pumping, and the second pumping/injection section is used for water injection, thereby forming the first minor circulation capable of remediating the first aquifer.

As shown in FIG. 3, a second minor circulation is formed by the combination of the second pumping/injection section and the third pumping/injection section and is located in the second aquifer. The third pumping/injection section is used for water pumping, and the second pumping/injection section is used for water injection, thereby forming the second minor circulation capable of remediating the second aquifer.

As shown in FIG. 3, a dual circulation is jointly formed by the first pumping/injection section, the second pumping/injection section and the third pumping/injection section, and a major circulation is formed by the combination of the first pumping/injection section and the third pumping/injection section. Specifically, the first pumping/injection section and the third pumping/injection section are used for simultaneous water pumping, and the second pumping/injection section is used for water injection, thereby forming the dual circulation mode capable of remediating the first aquifer and the second aquifer simultaneously, that is, the first minor circulation mode and the second minor circulation mode are combined to form the dual circulation mode. When the pumping/injection ways of the first pumping/injection section and the third pumping/injection section are opposite to each other, the major circulation is formed between the first pumping/injection section and the third pumping/injection section.

As above, a single multi-filter-layer groundwater circulation well can achieve at least four water circulation modes. Preferably, the water circulation modes can achieve the water circulation combination mode.

For example, in a case that the pollutants are mainly distributed in the first aquifer or the second aquifer, the control module is used to conduct groundwater remediation based on a water circulation combination mode formed by the combination of the first minor circulation or the second minor circulation and the major circulation. Specifically, the first pumping/injection section is used for water pumping, the second pumping/injection section and the third pumping/injection section are used for water injection, thereby forming a first minor circulation in the first aquifer, and forming a major circulation in the whole aquifer. The third pumping/injection section is used for water pumping, the first pumping/injection section and the second pumping/injection section are used for water injection, thereby forming a second minor circulation in the second aquifer, and forming a major circulation in the whole aquifer.

In a case that the pollutants are relatively uniformly distributed in the first aquifer and the second aquifer, the control module is used to conduct groundwater remediation based on a dual circulation mode. Specifically, as shown in FIG. 3, in adjacent multi-filter-layer groundwater circulation wells 7, a water circulation mode of one multi-filter-layer groundwater circulation well is to pump at the middle section and inject at both ends, and a water circulation mode of another multi-filter-layer groundwater circulation well is to inject at the middle section and pump at both ends, thereby forming a first minor circulation and a second minor circulation respectively in the first aquifer and the second aquifer to form the dual circulation.

Preferably, the multi-filter-layer groundwater circulation well 7 further includes multiple auxiliary wells 8. The auxiliary well 8 are used for monitoring concentration change of pollutants in the aquifer. The auxiliary wells are further used as chemical agent injection wells for injection chemical agents into the first aquifer 16 and the second aquifer 17.

Figure 2:
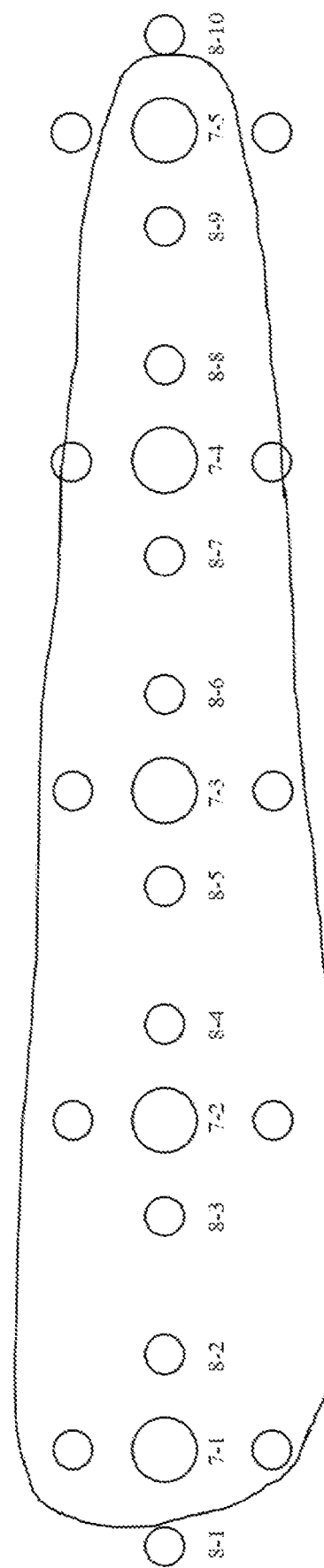
FIG. 2 is a top view of layout positions of multi-filter-layer groundwater circulation wells and auxiliary wells in accordance with a preferred embodiment of the present disclosure.

As shown in FIG. 2, the auxiliary wells 8 are arranged with the multi-filter-layer groundwater circulation well 7 as the center. Preferably, four auxiliary wells 8 surround one multi-filter-layer groundwater circulation well 7.

A wellbore of each auxiliary well 8 is separated by a second packer 22 into two space portions. At least one space portion of the auxiliary well 8 is provided with at least one injection pump 13 connected by an injection pipe 6. A horizontal height of the second packer 22 is close to or equal to a horizontal height of a medium stratification interface 14. Preferably, the injection pipe 6 is further connected to a dosing device 5, such that the chemical agent can enter the injection pump 13 through the injection pipe 6 and then is further injected into the first aquifer or the second aquifer. Preferably, the dosing device is arranged on the earth surface.

Preferably, as shown in FIG. 3, multiple multi-filter-layer groundwater circulation wells are arranged in groundwater flow direction, thus forming a groundwater circulation well group.

As shown in FIG. 3, the water pumping/injection pipe 4 of each multi-filter-layer groundwater circulation well is connected to a main pipeline 1. Preferably, the main pipeline 1 is provided with a main valve 3-30. A groundwater circulation well group consisting of five multi-filter-layer groundwater circulation wells is taken as an example for illustration.

As shown in FIG. 3, a first multi-filter-layer groundwater circulation well 7-1, a second multi-filter-layer groundwater circulation well 7-2, a third multi-filter-layer groundwater circulation well 7-3, a fourth multi-filter-layer groundwater circulation well 7-4 and a fifth multi-filter-layer groundwater circulation well 7-5 are sequentially arranged according to a groundwater flow direction. In a case that five multi-filter-layer groundwater circulation wells are provided, the main pipeline 1 is provided with fourteen valves, and one valve is connected between every two pumping/injection assemblies 2. For example, the main pipeline 1 is provided with a second valve 3-2, a fourth valve 3-4, a sixth valve 3-6, an eighth valve 3-8, a tenth valve 3-10, a twelfth valve 3-12, a fourteenth valve 3-14, a sixteenth valve 3-16, an eighteenth valve 3-18, and a twentieth valve 3-20 in sequence.

Each valve in the present disclosure may be a manual valve which is manually controlled to open/close, or may be an electronic valve which is automatically controlled by the control module to open/close.

The water circulation combination mode formed by the groundwater circulation well group is at least shown as follows.

In a case that the vertical distribution of a pollution plume between the multi-filter-layer groundwater circulation wells 7 is wide, and an edge position of the pollution plume is basically flush with the screen section, the control module is used to conduct a water circulation combination mode in a manner of enabling adjacent multi-filter-layer groundwater circulation wells 7 to conduct water circulation according to a dual circulation mode with opposite circulation directions. Specifically, in the water circulation modes of two multi-filter-layer groundwater circulation wells, one of the water circulation modes is to inject at the middle section and pump at both ends, and the other of the water circulation modes is to pump at the middle section and inject at both ends, such that the water injected from the screen section of one multi-filter-layer groundwater circulation well is captured by the pumping/injection screen section of another multi-filter-layer groundwater circulation well on the same horizontal line, thereby accelerating the remediation of pollution at the edge position of the pollution plume.

In a case that a vertical distribution of a pollution plume between the multi-filter-layer groundwater circulation wells 7 is narrow, and pollutants are mainly concentrated between upper and lower screen sections, the control module is used to conduct a water circulation combination mode in a manner of enabling adjacent multi-filter-layer groundwater circulation wells 7 to conduct water circulation according to a dual circulation mode with the same circulation direction. Specifically, the water circulation modes of two multi-filter-layer groundwater circulation wells are to pump at the middle section and inject at both ends at the same time, such that the water injected from the first pumping/injection section and the third pumping/injection section of one multi-filter-layer groundwater circulation well can be captured by the second pumping/injection section of another multi-filter-layer groundwater circulation well, thereby accelerating the remediation of pollution between upper and lower screen sections.

In a case that each valve of the multi-filter-layer groundwater circulation well is automatically controlled by the control module, the water circulation mode of each multi-filter-layer groundwater circulation well can be changed to form a dynamic update of the water circulation combination mode. In response to a control instruction of the control module, the pumping/injection states, flow rates and pressures of three pumping/injection sections of each multi-filter-layer groundwater circulation well 7 are changed by the pumping/injection assembly to form different water circulation modes or water circulation combination modes.

Preferably, an adaptive water circulation mode or a water circulation combination mode is selected by the control module based on distribution characteristics of the pollutants in the aquifer.

Preferably, based on the change of groundwater remediation degree, the water circulation combination mode is changed by the control module in a manner of closing at least one of multi-filter-layer groundwater circulation wells 7 in order.

Preferably, the control module is used to receive pollution data of groundwater provided by each auxiliary well and to match a corresponding water circulation combination mode according to the pollution data of the groundwater of each multi-filter-layer groundwater circulation well. The control module may be a processor, an application specific integrated circuit, or a server capable of matching water circulation mode data based on the pollution data. That is, the processor, the application specific integrated circuit or the server can operate a control program of a control method of the present disclosure.

Preferably, the control module is used to match or change the water circulation combination mode or the water circulation mode of a single multi-filter-layer groundwater circulation well according to the following ways.

Preferably, multiple multi-filter-layer groundwater circulation wells and auxiliary wells thereof are divided into upstream section equipment, midstream section equipment and downstream section equipment according to geographical locations. The pollution data monitored from one of the auxiliary wells in the upstream section is upstream pollution data. The pollution data monitored from one of the auxiliary wells in the midstream section is midstream pollution data.

The pollution data monitored from one of the auxiliary wells in the downstream section is downstream pollution data.

Preferably, the control module is used to determine and implement a water circulation combination mode based on the upstream pollution data, the midstream pollution data and the downstream pollution data.

Preferably, based on the groundwater pollution condition, the control module is used to regulate a water circulation mode, a flow rate and/or a pressure of each multi-filter-layer groundwater circulation well in a manner of enabling polluted groundwater to circulate in the groundwater circulation well group, thereby forming a truncation effect on the polluted groundwater.

For example, in the fifth multi-filter-layer groundwater circulation well 7-5, the first pumping/injection section stops, the second pumping/injection section is switched to a water injection state, and the third pumping/injection section kept at the water injection state, such that the water circulation of the fifth multi-filter-layer groundwater circulation well 7-5 is stopped, and the water circulation between the fifth multi-filter-layer groundwater circulation well 7-5 and the fourth multi-filter-layer groundwater circulation well 74 is started. In the water circulation, part of the groundwater flows from the fifth multi-filter-layer groundwater circulation well 7-5 to the fourth multi-filter-layer groundwater circulation well 74 in a way of reversing to a natural groundwater flow direction, the downstream trend of the pollution plume along the natural flow direction is truncated, and the pollution plume is returned to the fourth multi-filter-layer groundwater circulation well 74 by a reverse flow to achieve the purification circulation, which makes the groundwater flow direction change obviously.

Preferably, the specific implementation scenarios of the water circulation combination mode by the control module are described as follows.

1. Scenario 1

| Groundwater circulation well | Screen section | | |
| --- | --- | --- | --- |
| | Pumping/injection state of first pumping/injection section | Pumping/injection state of second pumping/injection section | Pumping/injection state of third pumping/injection section |
| First multi-filter-layer groundwater circulation well 7-1 | Pump water 200 m$^3$/d | Inject water 100 m$^3$/d | Inject water 100 m$^3$/d |
| Second multi-filter-layer groundwater circulation well 7-2 | Pump water 100 m$^3$/d | Inject water 200 m$^3$/d | Pump water 100 m$^3$/d |
| Third multi-filter-layer groundwater circulation well 7-3 | Inject water 100 m$^3$/d | Pump water 200 m$^3$/d | Inject water 100 m$^3$/d |
| Fourth multi-filter-layer groundwater circulation well 7-4 | Inject water 100 m$^3$/d | Pump water 200 m$^3$/d | Inject water 100 m$^3$/d |
| Fifth multi-filter-layer groundwater circulation well 7-5 | Inject water 100 m$^3$/d | Inject water 100 m$^3$/d | Pump water 200 m$^3$/d |

In the vicinity of a pollution source, the pollution range is wide and the concentration is high, and the pollutants are mainly distributed in a first aquifer with high hydraulic conductivity. The first multi-filter-layer groundwater circulation well 7-1 is controlled to be a water circulation mode of pumping at the upper section and injection at middle and lower sections, i.e., the first pumping/injection section and the second pumping/injection section of the first multi-filter-layer groundwater circulation well 7-1 in the first aquifer form a first minor circulation. The first pumping/injection section and the third pumping/injection section of the first multi-filter-layer groundwater circulation well 7-1 in the whole aquifer form a major circulation, which can enhance vertical flushing of the first aquifer and accelerate the remediation of pollution in the upper heavily polluted aquifer.

In a case that the pollutants are relatively uniformly distributed in the first aquifer and the second aquifer, the second multi-filter-layer groundwater circulation well 7-2, the third multi-filter-layer groundwater circulation well 7-3 and the fourth multi-filter-layer groundwater circulation well 7-4 are configured to employ a water circulation mode of pumping at the middle section and injecting at the upper and lower sections or injecting at the middle section and pumping at the upper and lower sections. That is, the first pumping/injection section and the second pumping/injection section in the first aquifer form a first minor circulation, and the second pumping/injection section and the third pumping/injection section in the second aquifer form a second minor circulation. Such an arrangement can remediate the pollution in the two aquifers at the same time. The choice of the above two water circulation modes depends on the distribution of the pollution plume between the two groundwater circulation wells.

In general, when the pollutants between the second multi-filter-layer groundwater circulation well 7-2 and the third multi-filter-layer groundwater circulation well 7-3 are uniformly distributed in the upper and lower aquifers, a vertical distribution of the pollution plume is wide, and upper and lower edges of the pollution plume are basically at the same horizontal height as the upper and lower boundaries of the screen section, some areas between the groundwater circulation wells may have circulation remediation blind zones. The second multi-filter-layer groundwater circulation well 7-2 employs a water circulation mode of injecting at the middle section and pumping at the upper and lower sections to form a first dual circulation, and the third multi-filter-layer groundwater circulation well 7-3 employs a water circulation mode of pumping at the middle section and injecting at the upper and lower sections to form a second dual circulation, i.e., different dual circulation modes are employed. According to such an arrangement, part of the water injected from the first pumping/injection section of the third multi-filter-layer groundwater circulation well 7-3 flows to the first pumping/injection section of the second multi-filter-layer groundwater circulation well 7-2, part of the water injected from the third pumping/injection section of the third multi-filter-layer groundwater circulation well 7-3 flows to the third pumping/injection section of the second multi-filter-layer groundwater circulation well 7-2, and the pollutants located in the circulation blind zone are hydraulically driven into a circulation remediation area along with the part of the injected water, so as to solve the problem of the remediation blind zone in single-well remediation. Part of the water injected from the second pumping/injection section of the second multi-filter-layer groundwater circulation well 7-2 flows to the second pumping/injection section of the third multi-filter-layer groundwater circulation well 7-3, and the pollutants between the groundwater circulation wells enter a water pumping screen section along with the part of water to be removed, thus accelerating the removal of the pollutants between the groundwater circulation wells.

The pollutants between the third multi-filter-layer groundwater circulation well 7-3 and the fourth multi-filter-layer groundwater circulation well 7-4 are uniformly distributed in the upper and lower aquifers, but a vertical distribution of the pollution plume is significantly narrower than that of the upstream in general, and the pollutants are mainly concentrated between the first pumping/injecting section and the third pumping/injecting section, so the fourth multi-filter-layer groundwater circulation well 7-4 employs a water circulation mode of pumping at the middle section and injecting at the upper and lower sections, that is, the same pumping/injecting mode is employed. Part of the water injected from the first pumping/injection section and the third pumping/injection section of the third multi-filter-layer groundwater circulation well 7-3 flows to the second pumping/injection section of the fourth multi-filter-layer groundwater circulation well 7-4, and part of the water injected from the first pumping/injection section and the third pumping/injection section of the fourth multi-filter-layer groundwater circulation well 7-4 flows to the second pumping/injection section of the third multi-filter-layer groundwater circulation well 7-3, thus forming the interaction effect between the third multi-filter-layer groundwater circulation well 7-3 and the fourth multi-filter-layer groundwater circulation well 7-4 to accelerate the remediation of pollution between the groundwater circulation wells.

At the edge of the pollution plume downstream the pollution source, the pollution range is narrow and the concentration is low, and the pollutants are mainly distributed in a second aquifer with low hydraulic conductivity. The fifth multi-filter-layer groundwater circulation well 7-5 employs a water circulation mode of pumping at the lower section and injecting at the middle and upper sections, i.e., the second pumping/injection section and the third pumping/injection section of the fifth multi-filter-layer groundwater circulation well 7-5 in the second aquifer form a second minor circulation, and the first pumping/injection section and the third pumping/injection section of the fifth multi-filter-layer groundwater circulation well 7-5 in the whole aquifer form a major circulation, which can enhance the vertical flushing of the second aquifer, so as to accelerate the removal of the pollutants from the second aquifer.

In addition, interaction effect may also be formed between the first multi-filter-layer groundwater circulation well 7-1 and the second multi-filter-layer groundwater circulation well 7-2, and between the fourth multi-filter-layer groundwater circulation well 7-4 and the fifth multi-filter-layer groundwater circulation well 7-5, i.e., part of water injected from one multi-filter-layer groundwater circulation well can flow to the water pumping screen section of the adjacent multi-filter-layer groundwater circulation well, and the pollutants located between the groundwater circulation wells can enter the water pumping screen section along with the part of the water to be removed, so as to achieve multi-well cooperation, eliminate the remediation blind zone in single multi-filter-layer groundwater circulation well, and accelerate the overall remediation of the aquifer.

| 2. Scenario 2 | | | |
|---|---|---|---|
| | Screen section | | |
| Groundwater circulation well | Pumping/injection state of first pumping/injection section | Pumping/injection state of second pumping/injection section | Pumping/injection state of third pumping/injection section |
| First multi-filter-layer groundwater circulation well 7-1 | Pump water 200 m³/d | Inject water 100 m³/d | Inject water 100 m³/d |
| Second multi-filter-layer groundwater circulation well 7-2 | Pump water 100 m³/d | Inject water 200 m³/d | Pump water 100 m³/d |
| Third multi-filter-layer groundwater circulation well 7-3 | Inject water 100 m³/d | Pump water 200 m³/d | Inject water 100 m³/d |
| Fourth multi-filter-layer groundwater circulation well 7-4 | Inject water 100 m³/d | Inject water 100 m³/d | Pump water 200 m³/d |
| Fifth multi-filter-layer groundwater circulation well 7-5 | Stop | Inject water 200 m³/d | Pump water 200 m³/d |

With continuous development of the remediation process, pollutant concentrations in monitoring wells are monitored in real time, and a graph can be drawn by the control module based on the pollution data. It is monitored in a ninth monitoring well 8-9 and a tenth monitoring well 8-10 at the outermost side of the pollution plume that the pollutant concentration in the first aquifer tends to be stable, and the stable concentration is lower than the groundwater quality standard, while the pollutant concentration in the second aquifer is still higher than the groundwater quality standard for three consecutive days, indicating that the remediation of the first aquifer is completed, and the remediation of the second aquifer is not completed. A hydrodynamic control system can be adjusted to stop the remediation of the first aquifer, that is, to stop the water injection at the first pumping/injection section of the fifth multi-filter-layer groundwater circulation well 7-5, so as to stop the major circulation between the first pumping/injection section and the third pumping/injection section of the fifth multi-filter-layer groundwater circulation well 7-5. Only the second pumping/injection section and the third pumping/injection section of the fifth multi-filter-layer groundwater circulation well 7-5 are used to form a second minor circulation in the second aquifer, and the first aquifer which has achieved a remediation goal no longer participates in the circulation. The water injection flow rate at the second pumping/injection section of the fifth multi-filter-layer groundwater circulation well 7-5 is increased to 200 m³/d, and the water pumping/injection flow rate of the fifth multi-filter-layer groundwater circulation well 7-5 is kept balance, so as to accelerate the pollution remediation of the second aquifer.

It is monitored in a seventh monitoring well 8-7 and an eighth monitoring well 8-8 that the pollutant concentration in the first aquifer is close to but slightly higher than the groundwater quality standard for three consecutive days, and the pollutant concentration in the second aquifer is still higher than the groundwater quality standard for three consecutive days, indicating that the pollution remediation of the first aquifer is about to be completed, and the remediation of the second aquifer is not completed, and thus the remediation of the first aquifer can be weakened, and the remediation of the second aquifer can be enhanced. That is, the second pumping/injection section of the fourth multi-filter-layer groundwater circulation well 7-4 is switched to inject water, with the flow rate reduced to 100 m³/d, and the third pumping/injection section of the fourth multi-filter-layer groundwater circulation well 7-4 is switched to pump water, with the flow rate increased to 200 m³/d, such that the pumping/injection mode of the fourth multi-filter-layer groundwater circulation well 7-4 can be switched to a water circulation mode of pumping at the lower section and injecting at the upper and middle sections. The second pumping/injection section and the third pumping/injection section of the fourth multi-filter-layer groundwater circulation well 7-4 in the second aquifer form a second minor circulation, and the first pumping/injection section and the third pumping/injection section of the fourth multi-filter-layer groundwater circulation well 7-4 in the whole aquifer form a major circulation, which can enhance the vertical flushing of the second aquifer, so as to accelerate the removal of pollutants from the second aquifer.

In a case that concentration curves monitored by the other monitoring wells are all higher than a limit value of the groundwater quality standard, it is indicated that the remediation is not completed, and the original pumping/injection ways of the first multi-filter-layer groundwater circulation well 7-1, the second multi-filter-layer groundwater circulation well 7-2 and the third multi-filter-layer groundwater circulation well 7-3 remain unchanged.

The water flow direction and cooperation way between the fourth multi-filter-layer groundwater circulation well 7-4 and the fifth multi-filter-layer groundwater circulation well 7-5 have changed due to the change of pumping/injection ways. Part of water injected from the second pumping/injection section of the fifth multi-filter-layer groundwater circulation well 7-5 flows to the third pumping/injection section of the fourth multi-filter-layer groundwater circulation well 7-4, and part of water injected from the first pumping/injection section and the second pumping/injection section of the fourth multi-filter-layer groundwater circulation well 7-4 flows to the third pumping/injection section of the fifth multi-filter-layer groundwater circulation well 7-5, thereby forming the interaction effect between the fourth multi-filter-layer groundwater circulation well 7-4 and the fifth multi-filter-layer groundwater circulation well 7-5 to accelerate the remediation of pollution between the groundwater circulation wells.

Other multi-well cooperation ways are unchanged.

3. Scenario 3

| Groundwater circulation well | Pumping/injection state of first pumping/injection section | Pumping/injection state of second pumping/injection section | Pumping/injection state of third pumping/injection section |
|---|---|---|---|
| First multi-filter-layer groundwater circulation well 7-1 | Pump water 200 m³/d | Inject water 100 m³/d | Inject water 100 m³/d |
| Second multi-filter-layer groundwater circulation well 7-2 | Pump water 100 m³/d | Inject water 200 m³/d | Pump water 100 m³/d |
| Third multi-filter-layer groundwater circulation well 7-3 | Inject water 100 m³/d | Inject water 100 m³/d | Pump water 200 m³/d |
| Fourth multi-filter-layer groundwater circulation well 7-4 | Stop | Inject water 200 m³/d | Pump water 300 m³/d |
| Fifth multi-filter-layer groundwater circulation well 7-5 | Stop | Inject water 50 m³/d | Inject water 50 m³/d |

It is monitored in a ninth monitoring well 8-9 and a tenth monitoring well 8-10 that pollutant concentrations in the first aquifer and the second aquifer tend to be stable, and the stable concentration is lower than the groundwater quality standard. It is monitored in the seventh monitoring well 8-7 and the eighth monitoring well 8-8 that the pollutant concentration in the first aquifer tends to be stable, and the stable concentration is lower than the groundwater quality standard, and the pollutant concentration in the second aquifer is still higher than the groundwater quality standard for three consecutive days, indicating that the remediation of the aquifer in the vicinity of the fifth multi-filter-layer groundwater circulation well 7-5 is completed, and that the in-well circulation remediation of the fifth multi-filter-layer groundwater circulation well 7-5 can be stopped. The remediation of the first aquifer in the vicinity of the fourth multi-filter-layer groundwater circulation well 7-4 is completed, the remediation of the second aquifer is not completed, and thus the remediation of the first aquifer can be stopped. That is, the third pumping/injection section of the fifth multi-filter-layer groundwater circulation well 7-5 is switched to inject water, and the flow rates at the second pumping/injection section and the third pumping/injection section of the fifth multi-filter-layer groundwater circulation well 7-5 are reduced to 50 m³/d, and the water injection at the first pumping/injection section of the fourth multi-filter-layer groundwater circulation well 7-4 is stopped. The flow rate at the second pumping/injection section of the fourth multi-filter-layer groundwater circulation well 7-4 is increased to 200 m³/d, and the flow rate at the third pumping/injection section of the fourth multi-filter-layer groundwater circulation well 7-4 is increased to 300 m³/d, thereby stopping in-well water circulation of the fifth multi-filter-layer groundwater circulation well 7-5, and stopping the major circulation between the first pumping/injection section and the third pumping/injection section of the fourth multi-filter-layer groundwater circulation well 7-4. Only the second pumping/injection section and the third pumping/injection section of the fourth multi-filter-layer groundwater circulation well 7-4 are used to form a second minor circulation in the second aquifer, the first aquifer which has achieved the remediation goal no longer participates in the circulation, and meanwhile, the water flow circulation between the fourth multi-filter-layer groundwater circulation well 7-4 and the fifth multi-filter-layer groundwater circulation well 7-5 is started. That is, the circulation from the fifth multi-filter-layer groundwater circulation well 7-5 to the fourth multi-filter-layer groundwater circulation well 7-4 is counter to a natural groundwater flow direction. As a result, the groundwater flow direction has changed greatly, and the water flow direction and cooperation way between the two wells have also changed. Part of water injected from the second pumping/injection section and the third pumping/injection section of the fifth multi-filter-layer groundwater circulation well 7-5 flows to the third pumping/injection section of the fourth multi-filter-layer groundwater circulation well 7-4, and the pollutants between the groundwater circulation wells enter the water pumping screen section along with the part of water to be removed, thus accelerating the remediation of the pollution in the second aquifer. Meanwhile, a hydraulic barrier formed at the fifth multi-filter-layer groundwater circulation well 7-5 prevents the pollution plume from spreading downstream.

It is monitored in a fifth monitoring well 8-5 and a sixth monitoring well 8-6 that the pollutant concentration in the first aquifer is close to but slightly higher than the groundwater quality standard for three consecutive days, and the pollutant concentration in the second aquifer is still higher than the groundwater quality standard for three consecutive days, indicating that the pollution remediation of the first aquifer is about to be completed, the remediation of the second aquifer is not completed, and thus the remediation of the first aquifer can be weakened and the remediation of the second aquifer can be enhanced. That is, the second pumping/injection section of the third multi-filter-layer groundwater circulation well 7-3 is switched to inject water, with the flow rate reduced to 100 m³/d, and the third pumping/injection section of the third multi-filter-layer groundwater circulation well 7-3 is switched to pump water, with the flow rate increased to 200 m³/d, such that the pumping/injection mode of the third multi-filter-layer groundwater circulation well 7-3 is switched to pump at the lower section and inject at the upper and middle sections. The second pumping/injection section and the third pumping/injection section of the third multi-filter-layer groundwater circulation well 7-3 in the second aquifer form a second minor circulation, and the first pumping/injection section and the third pumping/injection section of the third multi-filter-layer groundwater circulation well 7-3 in the whole aquifer form a major circulation, which can enhance the vertical flushing of the second aquifer, so as to accelerate the remediation of pollution of the second aquifer.

Pollutant concentrations monitored by other monitoring wells are higher than the groundwater quality standard for three consecutive days, indicating that the remediation is not completed, and the original pumping/injection ways of the first multi-filter-layer groundwater circulation well 7-1 and the second multi-filter-layer groundwater circulation well 7-2 remain unchanged.

The water flow direction and cooperation way between the third multi-filter-layer groundwater circulation well 7-3 and the fourth multi-filter-layer groundwater circulation well 7-4 have changed due to the change of pumping/injection ways. Part of water injected from the second pumping/injection section of the fourth multi-filter-layer groundwater circulation well 7-4 flows to the third pumping/injection section of the third multi-filter-layer groundwater circulation well 7-3, and part of water injected from the first pumping/injection section and the second pumping/injection section of the third multi-filter-layer groundwater circulation well 7-3 flows to the third pumping/injection section of the fourth multi-filter-layer groundwater circulation well 7-4, thereby forming the interaction effect between the third multi-filter-layer groundwater circulation well 7-3 and the fourth multi-filter-layer groundwater circulation well 7-4 to accelerate the remediation of pollution between the groundwater circulation wells.

Other multi-well cooperation ways are unchanged.

4. Scenario 4

| Groundwater circulation well | Pumping/injection state of first pumping/injection section | Pumping/injection state of second pumping/injection section | Pumping/injection state of third pumping/injection section |
|---|---|---|---|
| First multi-filter-layer groundwater circulation well 7-1 | Pump water 200 m³/d | Inject water 100 m³/d | Inject water 100 m³/d |
| Second multi-filter-layer groundwater circulation well 7-2 | Inject water 100 m³/d | Inject water 100 m³/d | Pump water 200 m³/d |
| Third multi-filter-layer groundwater circulation well 7-3 | Stop | Inject water 200 m³/d | Pump water 300 m³/d |
| Fourth multi-filter-layer groundwater circulation well 7-4 | Stop | Inject water 50 m³/d | Inject water 50 m³/d |
| Fifth multi-filter-layer groundwater circulation well 7-5 | Stop | Stop | Stop |

It is monitored in a seventh monitoring well 8-7 and an eighth monitoring well 8-8 that pollutant concentrations in the first aquifer and the second aquifer tend to be stable, and the stable concentration is lower than the groundwater quality standard. It is monitored in a fifth monitoring well 8-5 and a sixth monitoring well 8-6 that the pollutant concentration in the first aquifer tends to be stable, and the stable concentration is lower than the groundwater quality standard, and the pollutant concentration in the second aquifer is still higher than the groundwater quality standard for three consecutive days, indicating that the pollution remediation in the vicinity of the fourth multi-filter-layer groundwater circulation well 7-4 and in the downstream aquifer is completed, the pollution remediation in the upstream aquifer is not completed, and thus the in-well circulation of the fourth multi-filter-layer groundwater circulation well 7-4 and the water flow circulation between the fourth multi-filter-layer groundwater circulation well 7-4 and the fifth multi-filter-layer groundwater circulation well 7-5 can be stopped, and indicating that the remediation of the first aquifer in the vicinity of the third multi-filter-layer groundwater circulation well 7-3 is completed, the remediation of the second aquifer is not completed, and thus the remediation of the first aquifer can be stopped. That is, water injection at the second pumping/injection section and the third pumping/injection section of the fifth multi-filter-layer groundwater circulation well 7-5 is stopped, so as to stop the operation of the fifth multi-filter-layer groundwater circulation well 7-5. The third pumping/injection section of the fourth multi-filter-layer groundwater circulation well 7-4 is switched to inject water, the flow rates at the second pumping/injection section and the third pumping/injection section of the fourth multi-filter-layer groundwater circulation well 7-4 are reduced to 50 m³/d, the water injection at the first pumping/injection section of the third multi-filter-layer groundwater circulation well 7-3 is stopped, the flow rate at the second pumping/injection section of the third multi-filter-layer groundwater circulation well 7-3 is increased to 200 m³/d, and the flow rate at the third pumping/injection section of the third multi-filter-layer groundwater circulation well 7-3 is increased to 300 m³/d, thus stopping the circulation of in-well water flow of the fourth multi-filter-layer groundwater circulation well 7-4, and stopping a major circulation between the first pumping/injection section and the third pumping/injection section of the third multi-filter-layer groundwater circulation well 7-3. Only the second pumping/injection section and the third pumping/injection section of the third multi-filter-layer groundwater circulation well 7-3 are used to form a second minor circulation in the second aquifer, the first aquifer which has achieved the remediation goal no longer participates in the circulation, and meanwhile, the water flow circulation between the third multi-filter-layer groundwater circulation well 7-3 and the fourth multi-filter-layer groundwater circulation well 7-4 is started. That is, the circulation from the fourth multi-filter-layer groundwater circulation well 7-4 to the third multi-filter-layer groundwater circulation well 7-3 is counter to a natural groundwater flow direction. As a result, the groundwater flow direction has changed greatly, and the water flow direction and cooperation way between two wells have also changed. Part of water injected from the second pumping/injection section of the fourth multi-filter-layer groundwater circulation well 7-4 and the third pumping/injection section of the fourth multi-filter-layer groundwater circulation well 7-4 flows to the third pumping/injection section of the third multi-filter-layer groundwater circulation well 7-3, and the pollutants between the groundwater circulation wells enter the water pumping screen section along with the part of water to be removed, thus accelerating the removal of pollutants from the second aquifer. Meanwhile, a hydraulic barrier formed at the fourth multi-filter-layer groundwater circulation well 7-4 prevents the pollution plume from further spreading downstream.

It is monitored in a third monitoring well 8-3 and a fourth monitoring well 8-4 that the pollutant concentration in the first aquifer is close to but slightly higher than the groundwater quality standard for three consecutive days, and the pollutant concentration in the second aquifer is still higher than the groundwater quality standard for three consecutive days, indicating that the pollution remediation of the first aquifer is about to be completed, and the remediation of the second aquifer is not completed, and thus the remediation of the first aquifer can be weakened and the remediation of the second aquifer can be enhanced. The first pumping/injection section of the second multi-filter-layer groundwater circulation well 7-2 is switched to inject water, the flow rate at the second pumping/injection section of the second multi-filter-layer groundwater circulation well 7-2 is reduced to 100 m$^3$/d, and the flow rate at the third pumping/injection section of the second multi-filter-layer groundwater circulation well 7-2 is increased to 200 m$^3$/d, such that the pumping/injection mode of the second multi-filter-layer groundwater circulation well 7-2 is switched to pump at the lower section and inject at the upper and middle sections. The second pumping/injection section and the third pumping/injection section of the second multi-filter-layer groundwater circulation well 7-2 in the second aquifer form a second minor circulation, the first pumping/injection section and the third pumping/injection section of the second multi-filter-layer groundwater circulation well 7-2 in the whole aquifer form a major circulation, which can enhance the vertical flushing of the second aquifer, so as to accelerate the pollution remediation of the second aquifer.

The concentrations monitored by a first monitoring well 8-1 and a second monitoring well 8-2 are higher than the groundwater quality standard for three consecutive days, indicating that the remediation is not completed, and the original pumping/injection way of the first multi-filter-layer groundwater circulation well 7-1 remains unchanged.

The water flow direction and cooperation way between the second multi-filter-layer groundwater circulation well 7-2 and the third multi-filter-layer groundwater circulation well 7-3 have changed due to the change of pumping/injection ways. Part of water injected from the second pumping/injection section of the third multi-filter-layer groundwater circulation well 7-3 flows to the third pumping/injection section of the second multi-filter-layer groundwater circulation well 7-2, and part of water injected from the first pumping/injection section and the second pumping/injection section of the second multi-filter-layer groundwater circulation well 7-2 flows to the third pumping/injection section of the third multi-filter-layer groundwater circulation well 7-3, thereby forming the interaction effect between the second multi-filter-layer groundwater circulation well 7-2 and the third multi-filter-layer groundwater circulation well 7-3 to accelerate the remediation of pollution between the groundwater circulation wells.

| | 5. Scenario 5 | | |
|---|---|---|---|
| | Screen section | | |
| Groundwater circulation well | Pumping/injection state of first pumping/injection section | Pumping/injection state of second pumping/injection section | Pumping/injection state of third pumping/injection section |
| First multi-filter-layer groundwater circulation well 7-1 | Pump water 200 m$^3$/d | Inject water 200 m$^3$/d | Stop |
| Second multi-filter-layer groundwater circulation well 7-2 | Stop | Inject water 200 m$^3$/d | Pump water 300 m$^3$/d |
| Third multi-filter-layer groundwater circulation well 7-3 | Stop | Inject water 50 m$^3$/d | Inject water 50 m$^3$/d |
| Fourth multi-filter-layer groundwater circulation well 7-4 | Stop | Stop | Stop |
| Fifth multi-filter-layer groundwater circulation well 7-5 | Stop | Stop | Stop |

It is monitored in a fifth monitoring well 8-5 and a sixth monitoring well 8-6 that pollutant concentrations in the first aquifer and the second aquifer tend to be stable, and the stable concentration is lower than the groundwater quality standard. It is monitored in a third monitoring well 8-3 and a fourth monitoring well 8-4 that the pollutant concentration in the first aquifer tends to be stable, and the stable concentration is lower than the groundwater quality standard, and the pollutant concentration in the second aquifer is still higher than the groundwater quality standard for three consecutive days, indicating that the pollution remediation in the vicinity of the third multi-filter-layer groundwater circulation well 7-3 and in the downstream aquifer is completed, the pollution remediation in the upstream aquifer is not completed, and thus the in-well circulation of the third multi-filter-layer groundwater circulation well 7-3 and the water flow circulation between the third multi-filter-layer groundwater circulation well 7-3 and the fourth multi-filter-layer groundwater circulation well 7-4 can be stopped, and indicating that the remediation of the first aquifer in the vicinity of the second multi-filter-layer groundwater circulation well 7-2 is completed, and the remediation of the second aquifer is not completed. That is, water injection at the second pumping/injection section and the third pumping/injection section of the fourth multi-filter-layer groundwater circulation well 7-4 can be stopped, so as to stop the operation of the fourth multi-filter-layer groundwater circulation well 7-4. The third pumping/injection section of the third multi-filter-layer groundwater circulation well 7-3 is switched to inject water, the flow rates at the second pumping/injection section and the third pumping/injection section of the third multi-filter-layer groundwater circulation well 7-3 are reduced to 50 m$^3$/d. The water injection at the first pumping/injection section of the second multi-filter-layer groundwater circulation well 7-2 is stopped, the flow rate at the second pumping/injection section of the second multi-filter-layer groundwater circulation well 7-2 is increased to 200 m$^3$/d, and the flow rate at the third pumping/injection section of the second multi-filter-layer groundwater circulation well 7-2 is increased to 300 m$^3$/d, thus stopping the circulation of the in-well water flow of the third multi-filter-layer groundwater circulation well 7-3, and stopping a major circulation between the first pumping/injection section and the third pumping/injection section of the second multi-filter-layer groundwater circulation well 7-2. Only the second pumping/injection section and the third pumping/injection section of the second multi-filter-layer groundwater circulation well 7-2 are used to form a minor circulation in the second aquifer, the first aquifer which has achieved the remediation goal and no longer participates in the circulation, and meanwhile, the water flow circulation between the second multi-filter-layer groundwater circulation well 7-2 and the third multi-filter-layer groundwater circulation well 7-3 is started. That is, the circulation from the third multi-filter-layer groundwater circulation well 7-3 to the second multi-filter-layer groundwater circulation well 7-2 is counter to a natural groundwater flow direction. As a result, the groundwater flow direction has changed greatly, and the water flow direction and cooperation way between two wells have also changed. Part of water injected from the second pumping/injection section and the third pumping/injection section of the third multi-filter-layer groundwater circulation well 7-3 flows to the third pumping/injection section of the second multi-filter-layer groundwater circulation well 7-2, and the pollutants between the groundwater circulation wells enter the water pumping screen section along with the part of water to be removed, thus accelerating the removal of pollutants from the second aquifer. Meanwhile, a hydraulic barrier formed at the third multi-filter-layer groundwater circulation well 7-3 prevents the pollution plume from further spreading downstream.

It is monitored in a second monitoring well 8-2 and a first monitoring well 8-1 that the pollutant concentration in the second aquifer tends to be stable and the stable concentration is lower than the groundwater quality standard, and the pollutant concentration in the first aquifer is still higher than the groundwater quality standard for three consecutive days, indicating that the pollution remediation of the second aquifer is completed, and the remediation of the first aquifer is not completed, and thus the remediation of the second aquifer can be stopped. That is, the water injection at the third pumping/injection section of the first multi-filter-layer groundwater circulation well 7-1 is stopped, and a major circulation between the first pumping/injection section and the third pumping/injection section of the first multi-filter-layer groundwater circulation well 7-1 is stopped. Only a first minor circulation is formed between the first pumping/injection section and the second pumping/injection section of the first multi-filter-layer groundwater circulation well 7-1 in the first aquifer, and the second aquifer which has achieved the remediation goal no longer participates in the circulation. The water injection flow rate at the second pumping/injection section of the first multi-filter-layer groundwater circulation well 7-1 is increased to 200 m$^3$/d, and the pumping/injection flow rate of the first multi-filter-layer groundwater circulation well 7-1 is kept balance, so as to accelerate the pollution remediation of the second aquifer.

The water flow direction and cooperation way between the first multi-filter-layer groundwater circulation well 7-1 and the second multi-filter-layer groundwater circulation well 7-2 have changed due to the change of pumping/injection ways. Part of water injected from the second pumping/injection section of the second multi-filter-layer groundwater circulation well 7-2 flows to the first pumping/injection section of the first multi-filter-layer groundwater circulation well 7-1, and part of water injected from the second pumping/injection section of the first multi-filter-layer groundwater circulation well 7-1 flows to the third pumping/injection section of the second multi-filter-layer groundwater circulation well 7-2, thereby forming the interaction effect between the first multi-filter-layer groundwater circulation well 7-1 and the second multi-filter-layer groundwater circulation well 7-2 to accelerate the remediation of pollution between the groundwater circulation wells.

6. Scenario 6

| Groundwater circulation well | Pumping/injection state of first pumping/injection section | Pumping/injection state of second pumping/injection section | Pumping/injection state of third pumping/injection section |
|---|---|---|---|
| First multi-filter-layer groundwater circulation well 7-1 | Pump water 250 m$^3$/d | Inject water 200 m$^3$/d | Stop |
| Second multi-filter-layer groundwater circulation well 7-2 | Stop | Inject water 50 m$^3$/d | Stop |
| Third multi-filter-layer groundwater circulation well 7-3 | Stop | Stop | Stop |
| Fourth multi-filter-layer groundwater circulation well 7-4 | Stop | Stop | Stop |
| Fifth multi-filter-layer groundwater circulation well 7-5 | Stop | Stop | Stop |

It is monitored in the a third monitoring well 8-3 and a fourth monitoring well 8-4 at pollutant concentrations in the first aquifer and the second aquifer tend to be stable, and the stable concentration is lower than the groundwater quality standard. It is monitored in a first monitoring well 8-1 and a second monitoring well 8-2 that the pollutant concentration in the first aquifer is still higher than the groundwater quality standard for three consecutive days, indicating that the pollution remediation in the vicinity of the second multi-filter-layer groundwater circulation well 7-2 and in the downstream aquifer is completed, the pollution remediation in the upstream aquifer is not completed, and thus the in-well circulation of the second multi-filter-layer groundwater circulation well 7-2 and the water flow circulation between the second multi-filter-layer groundwater circulation well 7-2 and the third multi-filter-layer groundwater circulation well 7-3 can be stopped, and the first aquifer in the vicinity of the first multi-filter-layer groundwater circulation well 7-1 is continuously remediated, That is, water injection at the second pumping/injection section and the third pumping/injection section of the third multi-filter-layer groundwater circulation well 7-3 is stopped, thus stopping the operation of the third multi-filter-layer groundwater circulation well 7-3, and stopping the water pumping at the third pumping/injection section of the second multi-filter-layer groundwater circulation well 7-2. The flow rate at the second pumping/injection section of the second multi-filter-layer groundwater circulation well 7-2 is reduced to 50 m$^3$/d, the flow rate at the first pumping/injection section of the first multi-filter-layer groundwater circulation well 7-1 is increased to 250 m$^3$/d, thus stopping the in-well water flow circulation in the second multi-filter-layer groundwater circulation well 7-2, and starting the water flow circulation between the first multi-filter-layer groundwater circulation well 7-1 and the second multi-filter-layer groundwater circulation well 7-2. That is, the circulation from the second multi-filter-layer groundwater circulation well 7-2 to the first multi-filter-layer groundwater circulation well 7-1 is counter to a natural groundwater flow direction. As a result, the groundwater flow direction has changed greatly, and the water flow direction and cooperation way between two wells have also changed. Part of water injected from the second pumping/injection section of the second multi-filter-layer groundwater circulation well 7-2 flows to the first pumping/injection section of the first multi-filter-layer groundwater circulation well 7-1, and the pollutants between the groundwater circulation wells enter the water pumping screen section along with the part of water to be removed, thus accelerating the removal of pollutants from the second aquifer. Meanwhile, a hydraulic barrier formed at the second multi-filter-layer groundwater circulation well 7-2 prevents the pollution plume from further spreading downstream.

| 7. Scenario 7 | | | |
|---|---|---|---|
| | Screen section | | |
| Groundwater circulation well | Pumping/injection state of first pumping/injection section | Pumping/injection state of second pumping/injection section | Pumping/injection state of third pumping/injection section |
| First multi-filter-layer groundwater circulation well 7-1 | Stop | Stop | Stop |
| Second multi-filter-layer groundwater circulation well 7-2 | Stop | Stop | Stop |
| Third multi-filter-layer groundwater circulation well 7-3 | Stop | Stop | Stop |
| Fourth multi-filter-layer groundwater circulation well 7-4 | Stop | Stop | Stop |
| Fifth multi-filter-layer groundwater circulation well 7-5 | Stop | Stop | Stop |

It is monitored in a first monitoring well 8-1 and a second monitoring well 8-2 that pollutant concentrations in the first aquifer and the second aquifer tend to be stable, and the stable concentrations are lower than the groundwater quality standard, indicating that the pollution remediation in the vicinity of the first multi-filter-layer groundwater circulation well 7-1 and in the downstream aquifer is completed, that is, the remediation in the whole polluted area has been completed, and thus the operation of the first multi-filter-layer groundwater circulation well 7-1 and the second multi-filter-layer groundwater circulation well 7-2 can be stopped. The water pumping at the first pumping/injection section of the first multi-filter-layer groundwater circulation well 7-1 is stopped, and water injection at the second pumping/injection section of the first multi-filter-layer groundwater circulation well 7-1 and the second pumping/injection section of the second multi-filter-layer groundwater circulation well 7-2 is stopped, thus making the first multi-filter-layer groundwater circulation well 7-1 and the second multi-filter-layer groundwater circulation well 7-2 stop operating.

It should be noted that the above specific embodiments are exemplary, and those skilled in the art can come up with various solutions inspired by the present disclosure, and these solutions also belong to the scope of the present disclosure and fall within the scope of protection of the present disclosure. Those skilled in the art should understand that the description and drawings of the present disclosure are illustrative rather than limiting to the claims. The scope of protection of the present disclosure is defined by the claims and their equivalents. The description of the present disclosure contains a number of inventive concepts, such as "preferably", "according to a preferred embodiment" or "alternatively", all of which indicate that the corresponding paragraph discloses an independent concept, and the applicant reserves the right to propose a division based on each inventive concept.

What is claimed is:

1. A groundwater circulation well group, comprising at least two multi-filter-layer groundwater circulation wells, a plurality of assemblies, and a control module, wherein the at least two multi-filter-layer groundwater circulation wells are arranged in order along a groundwater flow direction, a wellbore of each multi-filter-layer groundwater circulation well is separated by at least two first packers to form three pumping or injection sections, each pumping or injection section is internally provided with at least one assembly for water, and the water pumping or water injection of the assembly is controlled by the control module, and a pipe wall of each pumping or injection section is provided with a perforated water screen pumping or injection section; in response to a control instruction of the control module, the states, flow rates and pressures of three pumping or injection sections of each multi-filter-layer groundwater circulation well are changed by the pumping or injection assembly to form different water circulation modes or water circulation combination modes; wherein the wellbore is separated by the two first packers to form a first pumping or injection section, a second pumping or injection section and a third pumping or injection section, horizontal heights of the first pumping or injection section, the second pumping or injection section and the third pumping or injection section decrease in order, and the horizontal height of the second pumping or injection section is close to or equal to a horizontal height of a medium stratification interface, the water circulation modes formed by the control module based on changing the pumping or injection state of each pumping or injection section at least comprise: a first minor circulation formed by the combination of the first pumping or injection section and the second pumping or injection section and located in a first aquifer; a second minor circulation formed by the combination of the second pumping or injection section and the third pumping or injection section and located in a second aquifer; a dual circulation jointly formed by the first pumping or injection section, the second pumping or injection section and the third pumping or injection section; and a major circulation formed by the combination of the first pumping or injection section and the third pumping or injection section, in a case that the pumping or injection state, the flow rate, the pressure and a circulation direction are regulated by the control module, the first minor circulation, the second minor circulation, the dual circulation and the major circulation are able to be combined under the control of the control module to form at least one water circulation combination mode.

2. The groundwater circulation well group according to claim 1, wherein an adaptive water circulation mode or a water circulation combination mode is selected by the control module based on distribution characteristics of pollutants in an aquifer.

3. The groundwater circulation well group according to claim 1, wherein the multi-filter-layer groundwater circulation well further comprises a plurality of auxiliary wells,
the auxiliary wells are arranged with the multi-filter-layer groundwater circulation well as the center;
a wellbore of each auxiliary well is separated by a second packer into two space portions, at least one space portion of the auxiliary well is provided with at least one injection pump connected by an injection pipe,
a horizontal height of the second packer is close to or equal to the horizontal height of the medium stratification interface.

4. The groundwater r circulation well group according to claim 1, wherein based on the change of groundwater remediation degree, the water circulation combination mode is changed by the control module in a manner of closing at least one of the multi-filter-layer groundwater circulation wells in order.

5. The groundwater circulation well group according to claim 1, wherein based on groundwater pollution conditions, a water circulation mode, a flow rate or a pressure of each multi-filter-layer groundwater circulation well is regulated by the control module in a manner of enabling polluted groundwater to circulate in the groundwater r circulation well group, thereby forming a truncation effect on the polluted groundwater.

6. The groundwater r circulation well group according to claim 1, wherein in a case that pollutants are mainly distributed in the first aquifer or the second aquifer, the control module is used to conduct groundwater remediation based on a water circulation combination mode formed by the combination of the first minor circulation or the second minor circulation and the major circulation;
in a case that the pollutants are relatively uniformly distributed in the first aquifer and the second aquifer, the control module is used to conduct groundwater remediation based on the dual circulation mode;
in a case that the vertical distribution of a pollution plume between the multi-filter-layer groundwater circulation wells is wide, and an edge position of the pollution plume is basically flush with the screen section, the control module is used to conduct a water circulation combination mode in a manner of enabling adjacent multi-filter-layer groundwater circulation wells to conduct water circulation according to a dual circulation mode with opposite circulation directions,
in a case that a vertical distribution of a pollution plume between the multi-filter-layer groundwater circulation wells is narrow, and pollutants are mainly concentrated between upper and lower screen sections, the control module is used to conduct a water circulation combination mode in a manner of enabling adjacent multi-filter-layer groundwater circulation wells to conduct water circulation according to a dual circulation mode with the same circulation direction.

7. A circulation mode control method for a groundwater circulation well group, wherein the control method at least comprises: regulating pumping states, flow rates and pressures of three pumping or injection sections of each multi-filter-layer groundwater circulation well to form different water circulation modes or water circulation combination modes, wherein a wellbore of each multi-filter-layer groundwater circulation well is separated by at least two first packers to form three pumping or injection sections, each pumping or injection section is internally provided with at least one pumping or injection assembly for water, the water pumping or water injection of the pumping or injection assembly is controlled by a control module, and a pipe wall of each pumping or injection section provided with a perforated water pumping or injection screen; wherein the method further comprises: forming at least one water circulation mode based on changing the pumping or injection state of each pumping or injection section; the water circulation mode at least comprises: a first minor circulation formed by the combination of the first pumping or injection section and the second pumping or injection section and located in a first aquifer; a second minor circulation formed by the combination of the second pumping or injection section and the third pumping or injection section and located in a second aquifer; a dual circulation jointly formed by the first pumping or injection section, the second pumping or injection section and the third pumping or injection section; and a major circulation formed by the combination of the first pumping or injection section and the third pumping or injection section; in a case that the pumping or injection state, the flow rate, the pressure and a circulation direction are regulated, the first minor circulation, the second minor circulation, the dual circulation and the major circulation are able to be combined under the control to form at least one water circulation combination mode.

8. The circulation mode control method for a groundwater circulation well group according to claim 7, wherein the method further comprises: selecting an adaptive water circulation mode or a water circulation combination mode based on distribution characteristics of pollutants in the aquifer; or changing the water circulation combination mode in a manner of closing at least one of the multi-filter-layer groundwater circulation wells in order based on the change of groundwater remediation degree; or regulating a water circulation mode, a flow rate or pressure of each multi-filter-layer groundwater circulation well in a manner of enabling the polluted groundwater to circulate in the groundwater circulation well group, thereby forming a truncation effect on the polluted groundwater.

9. The groundwater circulation well group according to claim 1, wherein an adaptive water circulation mode or a water circulation combination mode is selected by the control module based on distribution characteristics of pollutants in an aquifer.

10. The groundwater circulation well group according to claim 1, wherein the multi-filter-layer groundwater circulation well further comprises a plurality of auxiliary wells, the auxiliary wells are arranged with the multi-filter-layer groundwater circulation well as the center; a wellbore of each auxiliary well is separated by a second packer into two space portions, at least one space portion of the auxiliary well is provided with at least one injection pump connected by an injection pipe, a horizontal height of the second packer is close to or equal to the horizontal height of the medium stratification interface.

11. The groundwater circulation well group according to claim 2, wherein the multi-filter-layer groundwater circulation well further comprises a plurality of auxiliary wells,
the auxiliary wells are arranged with the multi-filter-layer groundwater circulation well as the center;
a wellbore of each auxiliary well is separated by a second packer into two space portions, at least one space portion of the auxiliary well is provided with at least one injection pump connected by an injection pipe,
a horizontal height of the second packer is close to or equal to the horizontal height of the medium stratification interface.

12. The groundwater circulation well group according to claim 9, wherein the multi-filter-layer groundwater circulation well further comprises a plurality of auxiliary wells, the auxiliary wells are arranged with the multi-filter-layer groundwater circulation well as the center; a wellbore of each auxiliary well is separated by a second packer into two space portions, at least one space portion of the auxiliary well is provided with at least one injection pump connected by an injection pipe, a horizontal height of the second packer is close to or equal to the horizontal height of the medium stratification interface.

13. The groundwater circulation well group according to claim 1, wherein based on the change of groundwater remediation degree, the water circulation combination mode is changed by the control module in a manner of closing at least one of the multi-filter-layer groundwater circulation wells in order.

14. The groundwater circulation well group according to claim 2, wherein based on the change of groundwater remediation degree, the water circulation combination mode is changed by the control module in a manner of closing at least one of the multi-filter-layer groundwater circulation wells in order.

15. The groundwater circulation well group according to claim 9, wherein based on the change of groundwater remediation degree, the water circulation combination mode is changed by the control module in a manner of closing at least one of the multi-filter-layer groundwater circulation wells in order.

16. The groundwater circulation well group according to claim 3, wherein based on the change of groundwater remediation degree, the water circulation combination mode is changed by the control module in a manner of closing at least one of the multi-filter-layer groundwater circulation wells in order.

17. The groundwater circulation well group according to claim 10, wherein based on the change of groundwater remediation degree, the water circulation combination mode is changed by the control module in a manner of closing at least one of the multi-filter-layer groundwater circulation wells in order.

18. The groundwater circulation well group according to claim 11, wherein based on the change of groundwater remediation degree, the water circulation combination mode is changed by the control module in a manner of closing at least one of the multi-filter-layer groundwater circulation wells in order.

* * * * *